Oct. 11, 1955  F. L. MALTBY  2,720,639
ELECTRICAL IMPULSE PRODUCING APPARATUS
Filed Aug. 9, 1951

INVENTOR.
Frederick L. Maltby
BY
E. C. Sanborn
Attorney

United States Patent Office 2,720,639
Patented Oct. 11, 1955

2,720,639

ELECTRICAL IMPULSE PRODUCING APPARATUS

Frederick L. Maltby, Naugatuck, Conn., assignor to The Bristol Company, Waterbury, Conn., a corporation of Connecticut Application August 9, 1951, Serial No. 241,136

15 Claims. (Cl. 340—207)

This invention relates to electrical telemetering systems, and more especially to a telemetering system of the impulse-frequency class, wherein the transmitted signal takes the form of a succession of electrical impulses occurring with a frequency representative of the magnitude of a variable measured at a transmitting station and adapted to translation into a corresponding measurement exhibited at a receiving station. A telemetering system comprises essentially a transmitting device, a receiving device and an interconnecting circuit or channel. The transmitting device includes means for performing a quantitative measurement upon a variable magnitude whose values it is desired to transmit, and for translating that measurement into an electrical signal or succession of signals, having characteristics specifically related to those values. The receiving instrument includes means responsive to said signals, and adapted to translate the same into a measurable deflection, generally of a physical part, whereby the measurement may be utilized to provide an indication, a graphic record, or a control function.

Telemetering systems or methods are customarily classified according to the nature of the transmitted signals. (See American Standard Definitions of Electrical Terms, A. S. A. Standard C-42, 1941.) Under this classification, the present invention may be considered as falling into either of two categories, "frequency" telemetering (Def. 30.40.185) or "impulse" telemetering (Def. 30.40.190). The reason for this dual classification is found in the fact that the transmitted signal may be in the nature of an alternating current (or voltage) having an essentially sinusoidal conformation, and being subject to the laws conventionally governing the transmission of alternating currents, but varying in fundamental frequency with the magnitude of the measured variable, or may take the form of a succession of discrete electrical impulses in the interconnecting circuit or channel, which impulses may, or may not, be filtered or otherwise conformed to a more or less alternating current (or potential) in the steps of translation from a transmitted signal to an exhibited measurement at the receiving station.

It is an object of this invention to provide telemetering means of the class set forth, wherein conversion of the measured variable to a continuous signal suitable for transmission, and translation of said signal into a corresponding measurement at the receiving station shall be effected with a minimum of error, and with a consistent accuracy over a wide range of values of said variables.

It is a further object to provide telemetering means of the above class wherein the relationships between the measured variable and the transmitted signal, and the received signal and the exhibited variable shall be substantially linear in their nature.

It is a further object to provide in telemetering means of the above class a transmitter including means whereby inherently to compensate for the effect of extraneous influences tending to cause departure from said linear relationship.

In carrying out the purposes of the invention, it is proposed to provide motor means including a feedback comprising a closed loop, and adapted to operate at a rotational velocity proportional to an electromotive force representative of the magnitude of the measured variable, and to cause the frequency of an alternating current (or voltage) of substantially constant amplitude, or the frequency of recurrence of a series of successive electrical impulses, to be controlled by the speed of said motor, whereby to provide a continuous signal having the desired frequency characteristics, adaptable to transmission over an interconnecting circuit or channel, and to translation into an expression of the measured quantity by means of a suitable frequency-responsive receiving instrument.

In the drawings:

Figs. 4 and 5 are diagrams showing the internal arrangements of certain components of the electric circuit illustrated in Fig. 1.

Figure 1:
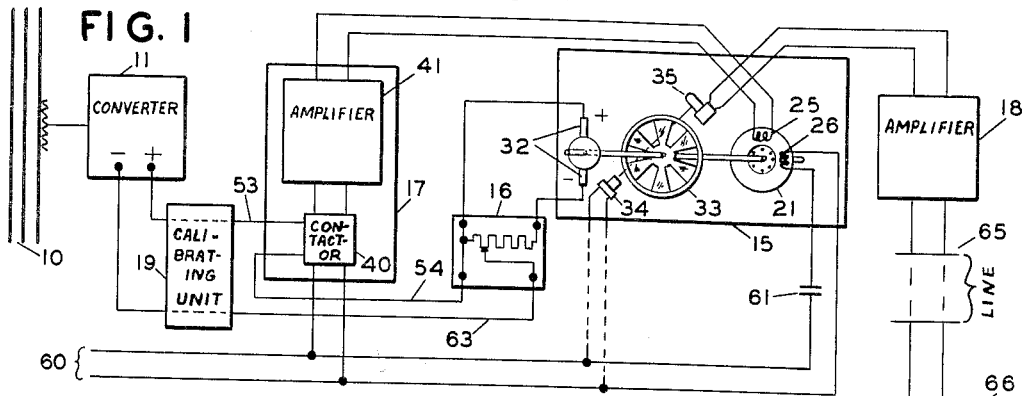
Fig. 1 is a diagrammatic representation of a telemetering system incorporating the principles of the invention.
Figure 5:
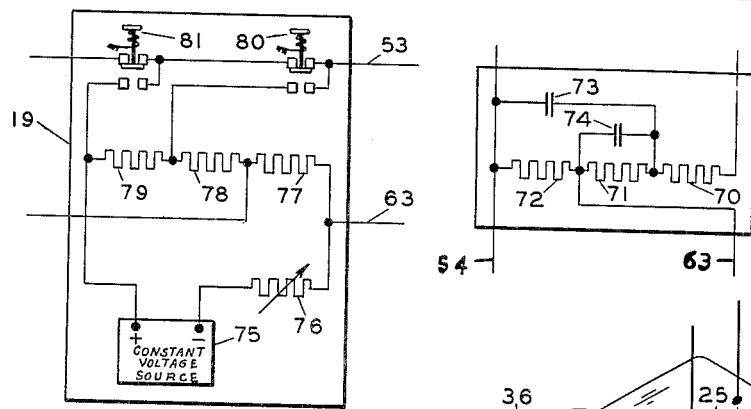

Referring now to the drawings:

Fig. 1 is a diagrammatic representation of a telemetering system incorporating the principles of the invention, and includes instrumentalities and circuits whereby to impress upon a transmitting channel a telemetering signal in the form of an alternating potential whose frequency is proportional to the magnitude of a measured variable, and further, to translate said signal into a representative measurement at a receiving station. The system is of special utility where the measured variable can be expressed in the form of a proportionate unidirectional electromotive force, and is therefore adaptable to the potentials developed by thermocouples, electrolytic cells, photo-cells, biological processes, ammeter shunts and the like. As a specific example of the applicability of the invention, its principles are herein set forth and described as adapted to the determination and transmission of electric power values in a line or feeder 10, having associated therewith a transducer 11 in the form of a thermal converter whereby to produce a measurable unidirectional electromotive force directly proportional to the power flowing in said line. Such converters are well known in the field of electrical measurement and are exemplified in the disclosure of U. S. Letters-Patent No. 2,283,566, granted to John H. Miller, May 19, 1942. No novelty is here claimed for the use of the thermal converter in the measurement of electrical power.

The means for producing an alternating voltage having a frequency proportional to the unidirectional potential representing the magnitude of the measured variable, and suitable for transmission to a receiving instrument, comprises a signal-generating unit 15, a voltage compensator 16 associated therewith, an inverter-detector unit 17, an amplifier 18, and a calibrating unit 19, these being operatively interconnected and coordinated as hereinafter to be set forth.

Figure 2:
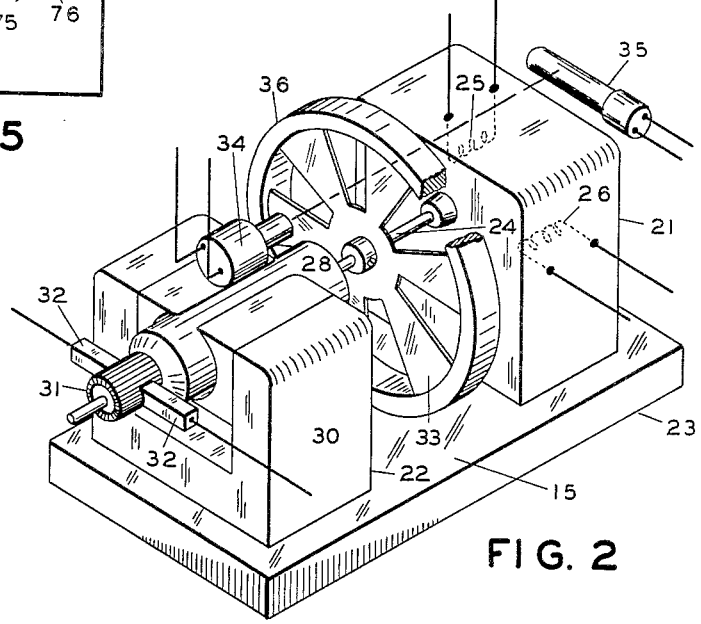
Fig. 2 is an isometric drawing of a motor-generator set suited to the purposes of the invention.

The signal generating unit 15, shown in detail in Fig. 2, comprises an alternating-current motor 21 and a direct-current generator 22, mounted on a common base 23, and having a common rotatable shaft 24 carrying the rotor of the motor and the armature of the generator. The motor 21 is of the two-phase induction type, having two stationary windings 25 and 26, geometrically displaced about the rotor, and adapted to be energized from suitable alternating-current sources having a common frequency and a phase displacement whereby to impart a torque to the rotor. The generator 22 is preferably of the magneto type, having an armature 28 carried by the shaft 24 and rotating in the field of a permanent magnet 30. The armature 28 is provided with a commutator 31 having brushes 32, bearing thereon at suitable points about its periphery. According to principles well known in the art, rotation of the armature 28 will cause to be developed between the brushes 32 a unidirectional electromotive force proportional to the speed of said rotation, and therefore to the angular velocity of the shaft 24 as driven by the motor 21.

Carried by the shaft 24 is a shutter 33 in the form of a disk, radially divided to have alternate solid and open portions adapted to the periodic interruption of a light beam when said disk is in rotation. Mounted on one side of the disk 33 is a source 34 adapted to project a beam of light in a direction substantially perpendicular to the plane of the disk to impinge upon a photocell 35. The light source 34 and the photocell 35 are so disposed with respect to each other and to the disk, that with rotation of the latter the light beam alternately passes through the openings therein and is interrupted by the solid portions thereof, whereby alternately to illuminate and darken the cell, thus rendering it available to develop in a suitable electrical circuit an alternating current or voltage having a frequency directly proportional to the speed of the shutter 35, and therefore to the voltage of the generator 22. For reasons hereinafter set forth, it is desirable that the rotating parts of the motor-generator combination possess a higher moment of inertia than would ordinarily characterize the units which best lend themselves to the purposes of the invention. The required fly-wheel effect may readily be incorporated in the apparatus by providing the shutter 33 with a rim portion 36 having such mass and dimensions as meet the requirements of the specific design.

The amplifier 18 is of conventional design, preferably incorporating a first stage of the "cathode-follower" type responsive to the impulses derived from the photocell 35, and one or more further stages adapted to deliver at the output terminals an alternating potential of substantially constant amplitude and of a frequency corresponding to that of the illumination of said photocell.

Figure 3:
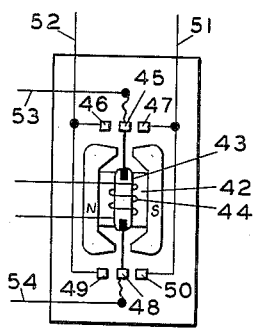
Fig. 3 shows details of a synchronous contactor forming a part of the electrical system of the invention.

The inverter-detector unit 17 comprises a synchronous reversing switch or commutator 40 in combination with an amplifier 41, whereby to develop from small values of unidirectional potential corresponding values of alternating voltage of substantially constant frequency and phase position, having an amplitude proportional to said potential. The synchronous reversing switch 40, shown in Fig. 3, may expediently be of the form fully described and set forth in copending application Serial No. 103,869 filed by J. L. Russell July 9, 1949; and, while no invention is herein claimed for said device, it may in the interest of completeness be briefly described as follows: A permanent magnet member 42 is fitted with pole pieces to provide two air gaps in which are located the extremities of a ferromagnetic structure 43 adapted to excitation by a winding 44. The armature 43 is provided at one of its extremities with a movable contact 45, adapted to engage alternatively two stationary contacts 46 and 47, and at the other of its extremities with a movable contact 48 adapted to engage alternatively two stationary contacts 49 and 50. The disposition of the magnetic structure and the relative proportioning of the other elements of the contactor are made such that upon energization of the winding 44 from an alternating-current source, the magnetic fluxes so established reacting with that from the permanent magnet 42, will cause the contacts 45 and 48 to partake of an oscillatory motion synchronous with the current flowing in said winding, and having such mutual relationship that during one half-wave of said current, the contacts 45 and 46 will be in engagement, and at the same time the contacts 48 and 50 will be in engagement, and during the other half-wave of said current the contact 45 will engage the contact 47 while the contact 48 will engage the contact 49. Thus, upon energization of the winding 44, the contacting device tends to function as a double-pole double-throw switch operating in synchronism with the current in the winding. Contacts 47 and 50 are connected to a common conductor 51, and contacts 46 and 49 to a common conductor 52; and contacts 45 and 48 are connected respectively to conductors 53 and 54. Thus, the contactor when energized by alternating current in the winding 44 will function as a synchronous reversing switch or commutator; so that upon a unidirectional potential being applied between the conductors 53 and 54, there will appear between the conductors 51 and 52 an inverted potential representative of said unidirectional potential and having a frequency of the current in said winding.

The method of relating and interconnecting the several elements of the system as thus far disclosed may now be set forth, as shown in Fig. 1. The winding 44 of the synchronous contactor 40 and the winding 26 of the motor 21 are connected to a common alternating-current supply source 60, from which may also, if desirable, be energized the light source 34. If required, a capacitor 61 or equivalent phase-shifting device may be included in the circuit of the motor winding 26, whereby to give the current therein a phase position adapted to optimum operating characteristics, all of which is well known in the art. The voltage compensator 16, while possessing novel features presently to be set forth, may for the moment in the interest of simplicity be considered as a simple voltage divider, comprising a tapped resistor, as indicated in Fig. 1, connected across the brushes 32 of the generator 22, and having one of its "output" terminals connected to the conductor 54 of the synchronous contactor 40.

The remaining terminal of the tapped portion of the voltage divider is connected by a conductor 63 to one side of the source of potential to be measured—in this instance the thermal converter 11, and the direct-current circuit is completed by connecting the conductor 53 of the synchronous contactor to the free terminal of said potential source. The function of the calibrating unit 19 being secondary to the basic operation of the system, discussion of this component of the system may in the interest of clarity be deferred, and for the moment, the conductors 53 and 63 considered as passing therethrough (as indicated by dotted lines in Fig. 1) and providing a direct connection between the measuring circuit and the source 11 of potential to be measured and converted into representative telemetering signals. By proper selection of polarity, and by suitable proportioning of the voltage divider, there is thus provided a circuit wherein the output of the generator 22 may be opposed to the potential of source 11, and the difference between the two commutated by the contactor 40 and impressed between the conductors 51 and 52, which in turn are connected to the input terminals of the amplifier 41.

The amplifier 41 is of conventional form, comprising such amplifying and filtering components as adapt it to responding to the inverted or commutated potential derived from the synchronous contactor 40 and deriving therefrom an alternating potential of proportionate amplitude and corresponding phase position. The output terminals of the amplifier 41 are connected to the winding 25 of the motor 21, whereby to apply to the same an alternating voltage of amplitude proportional to the magnitude of the unidirectional potential impressed upon the contactor 40, and having a phase position relative to the exciting voltage which will be dependent upon the polarity of said potential. Thus, while the winding 26 of the motor 21 is continuously excited by an alternating voltage of constant amplitude and phase position, the winding 25 will be subjected to a voltage whose amplitude and phase position are dependent upon the magnitude and polarity of the unbalance potential impressed upon the contactor 40. The input terminals of the amplifier 18, as previously pointed out, are connected to the photocell 35, and the output terminals are connected to a transmitting circuit or channel 65, whereby to impress upon the same a series of successive impulses, or an alternating potential, representative in frequency of those derived from said photocell. A receiving instrument 66, responsive to the frequency of said impulses, may be provided in an indicating or a recording form, and is connected to said circuit or channel 65 whereby to exhibit a continuous measure of said frequency.

The operation of the apparatus, as thus far set forth, is as follows: Assuming the winding 44 of the contactor 40 and the winding 26 of the motor 21 to be energized from the common alternating-current source 60, the contactor will operate mechanically as hereinbefore set forth, and the magnetic circuit of the motor will receive single-phase excitation; but, so long as no potential is impressed between the input terminals of said contactor, there will be zero output from the amplifier 41. Under this condition, the motor 21, having only one winding energized, will remain at rest, and no potential will be developed between the brushes 32 of the generator 22. It may now be assumed that a potential appears between the terminals of the source 11—this, if said source be a thermal converter as indicated, representing a power load in the line 10—said potential, being unopposed in the circuit which includes the contactor 40 and the voltage divider 16, will be impressed upon the input terminals of said contactor, and will appear as commutated voltage between the conductors 51 and 52, whereby the amplifier 41 will cause a corresponding alternating potential to be impressed upon the motor winding 25. The field of the current so produced, reacting with that from the winding 26, will produce a torque on the rotor of the motor, and will cause the shaft 24, carrying the armature of the generator 22, as well as the slotted disk 33, to rotate at a corresponding angular velocity. Polarity of the generator 22 being suitably selected, the portion of the generated potential delivered from the voltage divider 16 to the closed circuit including said divider, the contactor 40 and the source 11, will oppose the potential from the latter, tending to reduce the net voltage impressed upon the input side of the contactor, and correspondingly to reduce the alternating voltage supplied to the motor winding 25. Thus, as said motor operates, it will be responsible for an influence tending to reduce further acceleration, with the net result that there will be established a condition of equilibrium at which the potential between the contactor input conductors 53 and 54, which potential is the difference between that derived from the source 11 and that from the voltage divider 16, will be such as to produce in the motor winding 26 just sufficient driving influence to maintain the motor speed at a critical value. Should the motor tend to slow down, the reduction in generated potential will cause an increase in voltage applied to the synchronous contactor, with a corresponding increase in driving influence, and should the motor tend to speed up, the concomitant reduction in differential potential will similarly decrease the torque.

While the tendency of the motor speed is to become stable at a value representing a difference between the generated potential and the measured potential, it is possible by proper proportioning of coacting elements to reduce this difference to such a small magnitude that the speed at which equilibrium is established bears a substantially linear relation to the potential derived from the source under measurement. Thus, the frequency of impulses derived from the photocell 35 and impressed upon the receiving instrument 66 becomes a measure of the output potential of the converter 11, whereby said instrument will provide a continuous indication or record of the electric power flowing in the circuit 10. Operating characteristics of the apparatus have been found to be such that a difference of the order of 0.2% between the measured and the opposed potentials, applied to the input terminals of the synchronous contactor, will cause the motor to be operated at a speed to produce the maximum required frequency in the transmitted signal. As an example, it has been found that with a potential of 50 millivolts derived from the source to be measured, a condition of velocity equilibrium may be obtained with the voltage divider delivering an opposing potential of 49.9 millivolts to the circuit. While the ratio of speed to the measured voltage remains truly constant only so long as mechanical and electrical characteristics of the amplifying and feed-back system remain constant, yet it may be shown that substantial variations in these characteristics will result in relatively small over-all errors of measurement. Under practical operating conditions, the gain between the potential impressed upon the synchronous contactor and that derived from the voltage divider may be of the order of 1,000 or greater. In other words, the ratio between the utilized output of the generator and the "error signal" may be of the order of 1,000/1. So long as amplifier characteristics remain constant, the resulting deviation of 0.1% will enter into the calibration of the device, and may be allowed for in establishing the ratio between the measured potential and the transmitted frequency. Should conditions arise, due to changes in the electrical characteristics of the amplifier, to mechanical loading on the rotating system, or to variation of voltage impressed upon the constantly energized winding of the alteranting-current motor, whereby the gain of the system is altered, the effect of such changes on the overall calibration will be reduced in a corresponding ratio. Thus, should an abnormal condition, or combination of conditions act to change the value of the gain from 1000 to 500, the deviation originally of the order of 0.1%, as hereinbefore stated, will become 0.2%, or an error of 0.1% as compared with the basic calibration.

The voltage compensator 16 has hereinbefore been referred to as comprising a tapped resistor and performing the function of a voltage divider between the output terminals of the generator 22 and the circuit in which the potential to be measured is opposed thereto. From a practical standpoint, such a voltage divider is desirable, because, while the potentials encountered in the measuring circuit are likely to be in the order of less than ⅕ volt, commercial magneto generators of the type eminently adapted to the purposes of the invention are most readily available with standard output voltage ratings of the order of twenty times that value. As will be clear from Fig. 4 showing the internal arrangement of the voltage compensator, the principle of the tapped resistor, functioning as a voltage divider for unidirectional potentials is combined with other features which affect the transient characteristics of the system. The resistance element of the device is made up of three sections: 70, 71 and 72 arranged in series, and adapted for connection to the brushes 32 of the generator 22. The actual and relative values of the several resistance units will be dependent upon ratings and requirements of the system with which the device is associated; but as an example, the following is typical of values to be found in an operative system:

| | Ohms |
|---|---|
| Section 70 | 11,500 |
| Section 71 | 11,500 |
| Section 72 | 1,900 |

With the above proportioning of resistors, the output potential, as taken across the section 72 will bear to that impressed upon the three sections in series, a ratio of approximately 1/12.5, which represents the characteristic of the device considered solely as a voltage divider.

In addition to the series-connected resistors 70, 71 and 72 whereby the function of a voltage divider on the unidirectional output of the generator 22 is obtained, the compensator unit 16 includes also certain components responsive to transients and variables. Arrangement of the resistors being made such that the section 71 occupies the intermediate position in the series, said section and section 72 are bridged by a capacitor 73 connected from the point between sections 71 and 70 to the conductor at the remote side of the series. This capacitor is preferably selected to have a relatively high value of the order of 30 microfarads; and in bypassing alternating components of the potential impressed upon its terminals it performs a dual function. First, there are eliminated from the residual voltage appearing across the output terminals of the compensator, alternating components, such as commutator ripples, of relatively high frequency, which have been found to interfere with satisfactory performance of the synchronous contactor 40. Second, the capacitor 73 tends to absorb, and to some extent shunt, voltage variations due to changes in generator speed. The resultant delay in building up an opposing potential in the measuring circuit introduces a tendency toward "overshooting" in the motor-generator set. By suitable proportioning of mechanical parts and selection of electrical values, this phenomenon may be utilized to offset time delays due to mechanical and possible thermal inertia in the measuring system, and thus materially to increase the speed at which conditions of equilibrium will be established after any change in the measured quantity. Since the quick response referred to carries with it a tendency toward oscillation, further means are provided whereby such objectionable effects may be nullified.

The function of substantially complete stabilization lies primarily in the combination including the resistance section 72 and a capacitor 74 connected across the terminals of the resistance section 71. In investigations of the stability of closed loop systems, it is a recognized fact that such a system having a plurality of delays, together with a substantial gain of power will tend to oscillate with a frequency dependent upon the values of the several interacting components. The combination of the synchronous contactor 40, the amplifier 41, the motor 21 and movable parts including the generator 22 driven thereby, together with provision for feeding a part of the generator output into the contactor, constitutes such a loop, and as such, is capable of developing a state of oscillation having a frequency determined by the relative magnitude of the system components, and in no way subject to the frequency of the current in the alternating-current circuits. This phenomenon involves intricate mathematical considerations, and is fully discussed in chapter 6 of the book "Principles of Servomechanisms," by Professors G. S. Brown and D. P. Campbell of the Massachusetts Institute of Technology. (Wiley, New York, 1948.)

The range of frequencies within which it is possible for a closed loop to oscillate is limited by the gain in the system; and, by establishing the characteristic frequency of a loop at a value wherein the inherent gain is insufficient to maintain a resonant condition, it is possible to stabilize the system and reduce oscillation to a negligible value. In the present system this result is accomplished by inclusion of the capacitor 74, which, by its inherent delay in response to voltage variations due to changes in generator velocity, introduces a leading component in transient current drawn from the generator under such conditions, and a corresponding lead in the potential increment across the resistance section 72, thereby disturbing the phase position of the corresponding potential impressed upon the loop, with a resulting tendency to vary the resonant frequency thereof. In so far as transient phenomena in the direct-current portion of the loop is concerned, the resistance unit 71 performs no appreciable function, merely providing a path for the unidirectional component of current and thereby completing the circuit of the voltage divider. In the embodiment of the invention illustrated and discussed by way of example, it has been found that optimum performance is obtained when the capacitor 74 possesses a value of the order of 2 microfarads. It has also been found that stabilization is more readily effected than otherwise by suitably increasing the moment of inertia of the rotating system; and, as previously pointed out, this may readily be accomplished by fly-wheel effect introduced by the relatively massive rim 36 formed about the periphery of the shutter 33.

With the shaft 24, and consequently the shutter 33 rotating with a velocity proportional to the potential derived from the source 11, it will be obvious that the illumination reacting upon the photocell 35 through the slots in the shutter from the light source 34 will be periodically interrupted and restored with a corresponding frequency, and that the output of the amplifier 18 impressed upon the communicating circuit 65, will have a frequency proportional to the magnitude of said potential, but will have an amplitude substantially independent thereof.

As thus far described, the invention has been set forth as providing means for establishing an alternating voltage having a frequency proportional to a unidirectional potential, over an indefinite range of variation from zero to a maximum value. In actual practice it is found expedient to limit the range of frequency variation within a relatively narrow band, this being governed by the complication of transmitting and transforming currents having a wide range of frequency variation, and also by the desirability of providing a ready means for transmitting measurements corresponding to negative values of the measured variable, and carrying said measurements through a zero magnitude without loss of continuity. The desired limitation of frequency range is effected by the calibrating unit 19; and the dual function performed by this component of the system will now be explained. Comprised within the unit 19 is a constant potential source 75, which, while in its simplest form consisting of a suitable voltaic or storage cell, may preferably be in the nature of an automatically regulated D.-C. supply, as, for example, the device fully set forth and described in co-pending application Serial No. 195,963, filed by A. W. Jacobson and myself November 16, 1950.

Connected in the order indicated across the terminals of the constant-potential source 75 to be energized therefrom is a load comprising a series of resistance units 76, 77, 78 and 79, of which the resistor 76 is made variable for the purpose of adjusting the current in, and therefore the potentials across, the remaining units in the series, while the remaining resistors are of predetermined fixed values presently to be discussed. The unit 19 includes two spring-opposed single-pole double-throw switches 80 and 81. The switches 80 and 81 are connected in the conductor 53 in such a manner that in their normal positions said conductor passes uninterruptedly through the unit from the potential source 11 to the contactor 40. The conductor 63, instead of passing directly through the unit 19 as indicated in Fig. 1 has in series therewith the fixed resistor 77, so that the potential thereacross will be continuously included in the measuring circuit. The normally open contact of the switch 80 is connected to the point between the resistors 78 and 79 so that when said switch is manually actuated, the potential impressed between the conductors 53 and 63 in the measuring circuit, instead of being the sum of that from the source 11 and that across the resistor 77 will be the sum of the latter potential and that across the resistor 78. Similarly, the free terminal of the switch 81 is connected to the extremity of the resistor 79 remote from the resistor 78, so that actuation of said switch will substitute the potential across the resistors 78 and 79 in series for that derived from the source 11.

The resistor 77 is made of such a value that by suitable adjustment of the current therethrough the potential across its terminals alone when impressed upon the measuring circuit will be such as to cause the motor 21 to be operated at a "base" speed selected to correspond to a zero value of the measured quantity, so that the speed of the motor 21 in its relation to that quantity will vary, not from zero angular velocity, but from the "base" speed representing the constant electromotive force across the resistor 77. For example, in a certain measurement where it was required to transmit measurements of a quantity represented by potentials ranging from 0 to 50 millivolts, the potential across the resistor 77, established at a value of 78 millivolts was included in the measuring circuit and added to that derived from the source to be measured, so that the range of potentials to be met by those derived from the magneto generator was from 78, representing a zero measured value, to 128 representing the other extreme of the range. Output frequencies in the circuit 65, corresponding to these values were made 16½ and 27 cycles per second respectively, thus allowing the full scale of measurement to be represented by a frequency variation of 39% of the maximum value, instead of 100% as would have been the case without the constant potential bias. A further advantage of the permanent bias in the measuring circuit is found in the fact that it permits the system to take cognizance of negative values of the measured quantity. If the potential representing that variable should reverse with negative values, the combined potential of the measured source and the constant source would become less than the normal bias, with the result that the transmitted frequency would be correspondingly lowered, and the continuity of representation preserved. If the receiving instrument be constructed, or adjusted, to have a suitably elevated zero point—all of which is well known in the art—, positive and negative values of the measured quantity will have equal significance in the record, and over-all measurement will be effected without loss of continuity.

The resistors 78 and 79 in the series connection of the calibrating unit 19 provide means for checking the accuracy of the system at selected points of its range. For example, these units may be selected of such values as to present voltage drops corresponding respectively to (say) 10% and 80% of the range of measurement. Then, by depressing the switch 80, which substitutes the potential across resistor 78 for that derived from the source 11, there is established a standardized condition corresponding to 10% of the full range of measurement, permitting the accuracy to be checked, and if necessary adjusted at that point. Similarly, by depressing the switch 81, there is established a condition wherein the sum of the potentials across the resistors 78 and 79 in series, corresponding to 90% of the range, is substituted for the measured potential, enabling similar checks to be made at that portion of the range. It will be understood that check points of 10% and 90% have been selected solely as examples, and that by suitable selection of resistance values for the corresponding units, the corresponding check points may be established at any desired portions of the measuring range, and also that the number of discrete points at which checks may be performed can be increased indefinitely by the addition of further calibrated resistors and associated switches.

The terms and expressions which I have employed are used as terms of description and are not of limitation, and I have no intention, in the use of such terms and expressions, of excluding any equivalents of the features shown and described or portions thereof, but recognize that various modifications are possible within the scope of the invention claimed.

I claim:

1. Apparatus for producing electrical impulses of frequency representative of the value of a unidirectional electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means responsive to the difference between said electromotive forces for causing operation of said motor at a velocity representative of said difference, and means operated by said motor for producing electrical impulses having a frequency proportional to said velocity.

2. Apparatus for producing electrical impulses of frequency representative of the value of a unidirectional electromotive force, said apparatus comprising an alternating current electric motor, a direct current generator connected to said motor for operation thereby and adapted to develop an electromotive force proportional to its velocity, a circuit wherein the electromotive force developed by said generator may be opposed to the first-mentioned electromotive force, means for converting the difference between said electromotive forces into a corresponding alternating voltage, means responsive to said alternating voltage for operating said motor at a velocity representing the value of said difference, and means operated by said motor and adapted to produce a series of electrical impulses having a frequency proportional to the velocity thereof.

3. Apparatus for producing electrical impulses of frequency representative of the value of a unidirectional electromotive force, said apparatus comprising an alternating current motor and a direct current generator driven thereby, a circuit for opposing the output of said generator to said electromotive force to produce a residual potential, means responsive to said residual potential for producing an alternating voltage of corresponding magnitude, means responsive to said alternating voltage to affect the speed of said motor and generator, and means operated by said motor for producing a series of electrical impulses of substantially constant amplitude and having a frequency proportional to the speed of said motor-generator set.

4. Apparatus for producing electrical impulses of frequency representative of the value of a unidirectional electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means in said circuit responsive to the difference between said electromotive forces, means for driving said motor at a speed representing the value of said difference, a constant voltage source connected in said circuit and corresponding to a predetermined value of the first-mentioned electromotive force, whereby said motor will rotate in one direction when said first-named electromotive force varies above or below a zero value, and means operated by said motor for producing a series of electrical impulses having a frequency proportional to the speed thereof.

5. Apparatus for producing electrical impulses of frequency representative of the value of a unidirectional electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means in said circuit responsive to the difference between said electromotive forces, means for driving said motor at a speed representing the value of said difference, a constant voltage source connected in said circuit for adding a predetermined voltage to the first-mentioned electromotive force, whereby said motor will continue to rotate at zero value of said first-mentioned electromotive force and will rotate in one direction when said first-named electromotive force varies above or below said zero value, and means operated by said motor for producing a series of electrical impulses having a frequency proportional to the speed thereof.

6. Apparatus for producing electrical impulses of frequency representative of the value of a unidirectional electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means in said circuit responsive to the difference between said electromotive forces, means for driving said motor at a speed representing the value of said difference, means operated by said motor for producing electrical impulses having a frequency proportional to the speed of said motor, and means for substituting at will in said circuit for said electromotive force to be measured a predetermined constant potential, whereby to provide a standard reference value for calibration of said motor speed.

7. Apparatus for producing electrical impulses of frequency representative of the value of a unidirectional electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means in said circuit responsive to the difference between said electromotive forces, means for driving said motor at a speed representing the value of said difference, a constant voltage source connected in said circuit for adding a predetermined voltage to the first-mentioned electromotive force, whereby said motor will continue to rotate in a given direction for values of said first-mentioned electromotive force above and below a zero value, means for substituting at will in said circuit for said first-mentioned electromotive force a predetermined constant potential to provide a standard reference potential for calibration of said motor speed, and means operated by said motor for producing electrical impulses having a frequency proportional to the speed of said motor.

8. Apparatus for producing electrical impulses of frequency representative of the value of a unidirectional electromotive force, said apparatus comprising a motor-generator set wherein the generator is adapted to develop an electromotive force proportional to its velocity, a circuit wherein is impressed said first-named electromotive force, a voltage-divider connected across the terminals of said generator and having a portion included in said circuit whereby to apply only a part of the generator voltage to said circuit and in opposition to said first-named electromotive force, said voltage divider including a reactive portion whereby to introduce a time constant and thereby modify the effect of changes in generator electromotive force upon electrical conditions in said circuit, and means operated by said motor and adapted to produce a series of electrical impulses having a frequency proportional to the speed thereof.

9. Apparatus for producing electrical impulses of frequency representative of the value of a unidirectional electromotive force, said apparatus comprising a motor-generator set wherein the generator is adapted to develop an electromotive force proportional to its velocity, a circuit wherein is impressed said first-named electromotive force, a voltage-divider connected across the terminals of said generator and having a portion included in said circuit whereby to apply only a part of the generator voltage in said circuit and in opposition to said first-named electromotive force, and including a capacitor connected across a portion of said voltage divider other than that included in said circuit, whereby to delay the effect upon said portion of changes in generator electromotive force and thereby correspondingly advance the effect of said changes upon electrical conditions in said circuit, and means operated by said motor and adapted to produce a series of electrical impulses having a frequency proportional to the speed thereof.

10. Apparatus for producing electrical impulses of frequency representative of the value of a unidirectional electromotive force, said apparatus comprising a motor-generator set wherein the generator is adapted to develop an electromotive force proportional to its velocity, a circuit wherein is impressed said first-named electromotive force, a voltage-divider connected across the terminals of said generator and having a portion included in said circuit whereby to apply only a part of the generator voltage in said circuit and in opposition to said first-named electromotive force, said voltage divider including two capacitors, one being connected across a portion other than that included in said circuit whereby to delay the effect upon said portion of changes in generator voltage and thereby correspondingly advance the effect of said changes upon electrical conditions in said circuit, and the other capacitor being connected across said two portions in series whereby to eliminate from said circuit rapidly varying components of the generator electromotive force, and means operated by said motor and adapted to produce a series of electrical impulses having a frequency proportional to the speed thereof.

11. In a telemetering system for transmitting electrical signal impulses to a distant receiving instrument, a transmitting device comprising a motor-generator set wherein the generator is adapted to develop an electromotive force proportional to its velocity, a circuit for opposing said electromotive force to another electromotive force, means controlled by the difference between said electromotive forces for controlling the velocity of said motor, and means operated by said motor for producing electrical impulses having a frequency proportional to said velocity.

12. In a telemetering system for transmitting electrical signal impulses to a distant receiving instrument, a transmitting device comprising a motor-generator set having an alternating current motor and a direct current generator adapted to develop an electromotive force proportional to its velocity, a circuit for opposing said electromotive force to another electromotive force, means for converting the difference between said electromotive forces into a corresponding alternating potential, means responsive to said alternating potential for controlling the speed of said motor, and means operated by said motor for producing electrical impulses of substantially constant amplitude and of frequency proportional to the speed of said motor.

13. In a telemetering system for transmitting electrical signal impulses to a distant receiving instrument, a transmitting device comprising a motor-generator set wherein the generator is adapted to develop an electromotive force proportional to its velocity, a circuit for opposing said electromotive force to another electromotive force, means controlled by the difference between said electromotive forces for controlling the velocity of said motor, means operated by said motor for producing electrical impulses having a frequency proportional to said velocity, and means for stabilizing operation of said motor, said means comprising a capacitor connected to said circuit and a fly-wheel element driven by said motor.

14. In a system having provision for producing a uni-directional electromotive force representative of a variable magnitude, apparatus for producing electrical impulses of frequency representative of the value of said electromotive force, said apparatus comprising an electric motor, a direct current generator connected to said motor for operation thereby and adapted to develop an electromotive force proportional to its velocity, a circuit wherein the electromotive force developed by said generator may be opposed to the first-mentioned electromotive force, means responsive to the difference between said electromotive forces for causing operation of said motor at a velocity representative of said difference, and means operated by said motor for producing electrical impulses having a frequency proportional to said velocity.

15. In a telemetering system for transmitting electrical signal impulses to a distant receiving instrument, a transmitting device comprising a motor-generator set wherein the generator is adapted to develop an electromotive force proportional to its velocity, a circuit for opposing said electromotive force to another electromotive force, means controlled by the difference between said electromotive forces for controlling the velocity of said motor, means operated by said motor for producing electrical impulses having a frequency proportional to said velocity, a telemetering channel and connections for applying said electrical impulses thereto, and a receiving instrument connected to said channel for response to said impulses.

References Cited in the file of this patent

UNITED STATES PATENTS

| | | |
|---|---|---|
| 912,291 | Cuntz | Feb. 16, 1909 |
| 2,462,751 | Koehler | Feb. 22, 1949 |
| 2,484,089 | Haynes | Oct. 11, 1949 |
| 2,493,079 | Mott et al. | Jan. 3, 1950 |
| 2,513,537 | Williams | July 4, 1950 |
| 2,640,974 | Oman et al. | June 2, 1953 |

FOREIGN PATENTS

| | | |
|---|---|---|
| 426,144 | Great Britain | Mar. 28, 1935 |